Patented Feb. 9, 1937

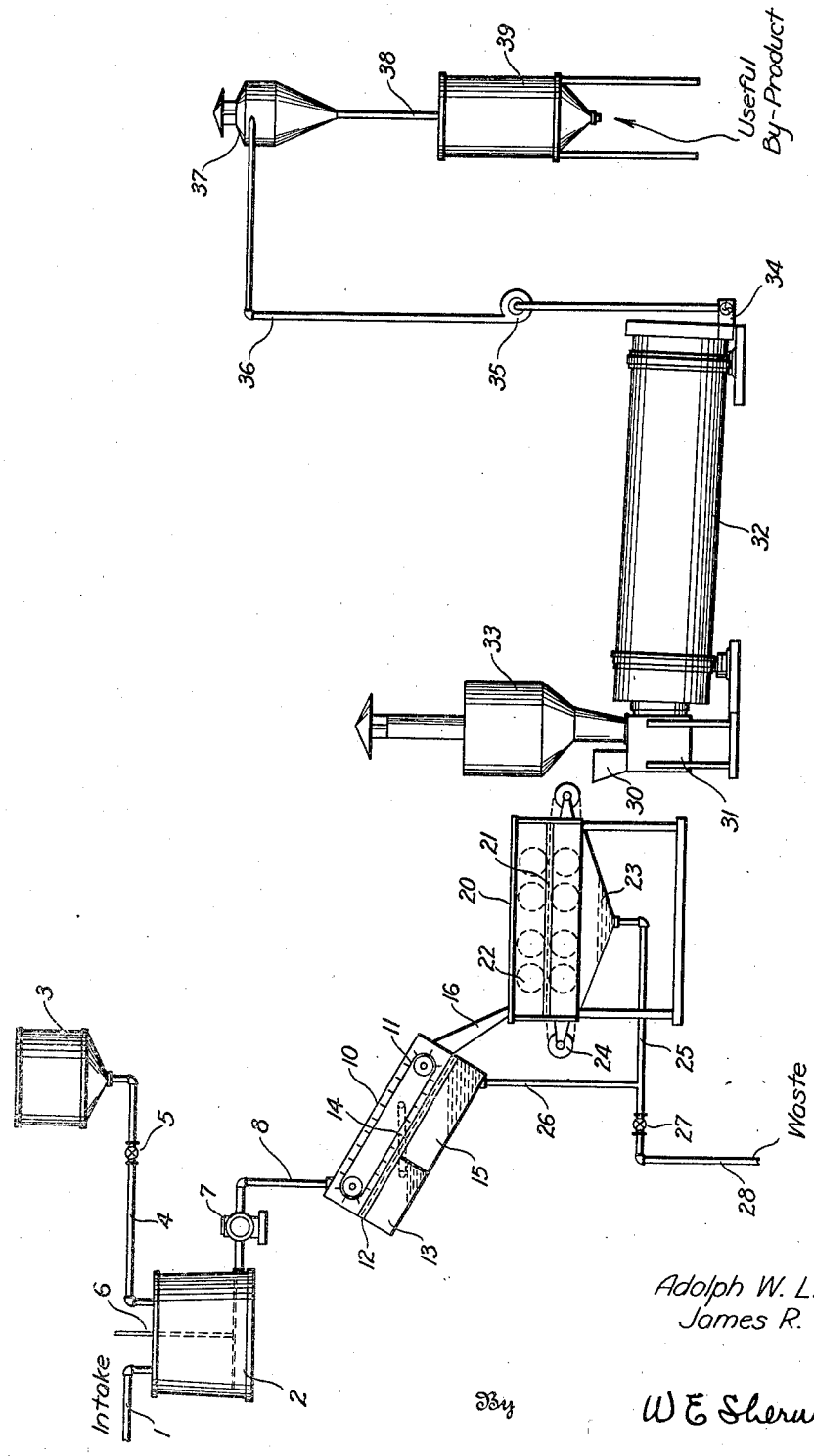

2,070,284

UNITED STATES PATENT OFFICE 2,070,284

TREATING DISTILLERY SLOP AND FEED SUBSTANCE PRODUCED THEREBY

Adolph W. Lissauer and James R. Coffey, Louisville, Ky., assignors, by mesne assignments, to Louisville Drying Machinery Company, Incorporated, Louisville, Ky., a corporation of Kentucky Application October 10, 1934, Serial No. 747,712

3 Claims. (Cl. 99—5)

The present invention relates to an improved method of treating distillery slop, having as an objective the two fold purpose of reclaiming a valuable by-product therefrom and at the same time eliminating the problem of the disposition of waste materials found in the slop.

The thick slop resulting from the complex distillation process contains all of the grain elements used in forming the mash with the exception of the starch element of the grains which has been converted into alcohol. In such slop the largest part of the remaining grain elements are to be found in a state of suspension, while a small part including albumen and albuminoids will be found in a state of solution. This large amount of suspended elements consists primarily of bran, yeast particles and other organic matter. While the heavier suspended elements such as the coarse bran may precipitate of their own accord, by far the greater part of the small grain particles are apparently in a state of colloidal suspension and consequently will not voluntarily precipitate nor lend themselves to a thorough mechanical filtering process. In a co-pending application hereinafter referred to, a method of precipitating these colloidal suspended particles by the use of sodium chloride is taught. However, such a process requires a relatively long period of time and works to best advantage in a thin slop from which the heavier suspended elements such as the coarse bran particles have already been removed.

As a result of experimentation, we have discovered that by the use of certain chemical precipitation agents the phase of these minute colloidal suspensions can be so changed that a rapid and complete precipitation of the same will be accomplished in a short period of time.

It has been found that chlorine-liberating agents are especially effective in producing this coagulation of the soluble proteids and in liberating the minute grain particles held in colloidal suspension. More particularly, the use of chlorine itself, or a compound containing chlorine such as bleaching powder, sodium hypochlorite, calcium hypochlorite or potassium hypochlorite has proven to be successful. The particular agent employed and the amount of the agent used will depend upon numerous factors, such as cost of the agent, amount of slop to be treated and nature of the slop. As one example, if calcium hypochlorite alone is used, it is found that a proportion of approximately 2 grams per gallon of slop or .13 lb. per bushel of grain mashed, is most effective. The behavior of the chemical in the slop is such that the precipitation can be completed in approximately 15 to 20 minutes. As the heavier grain elements sink to the bottom of the container and the lighter liquid is displaced upwardly, the relative movements of the same effect a filtering action, causing an agglomeration of the small grain elements formerly held in colloidal suspension. As a result the precipitation is definite and complete and the supernatant liquid is entirely free of fine, light suspensions.

It is believed that this desirable action of the above precipitation agents is due to the behavior of the hypochlorous acid contained in the solution. Hypochlorous acid readily disassociates to form oxygen, chlorine and hydrochloric acid and when mixed with the thick slop it will so affect the phase of the albuminoids held in solution that a coagulation of them will have the effect of precipitating the organic matter which they tend to hold in colloidal suspension. Moreover, the hypochlorous acid has a powerful oxidizing and chlorinating effect upon materials with which it is brought into contact. An equally important advantage growing out of the use of such agents is due to the fact that the liberated chlorine has a powerful destructive effect on low organisms and is thus useful as a disinfectant. In the present utilization, this property of the chlorine enables the user to drain off the sterile supernatant liquid without further treatment and still be assured that no subsequent putrefaction of the same can take place.

In the co-pending application of James R. Coffey, Serial No. 747,183, filed October 6, 1934, certain disadvantages of the present methods of treating distillery slop are set forth and a new method of treating the slop is disclosed. While the method taught by said disclosure has indeed proven to be satisfactory in practice and although the resulting by-product is superior to many now on the market, nevertheless certain inherent disadvantages are found even in this improved method.

The chief disadvantage resides in the necessity for using a plurality of pieces of large, expensive apparatus. For example, large conveyors for moving the pressed product, the dried product, and the sludge are required. Several storage bins, settling tanks, pipes and the like are needed and the cost of installation of such a plant consequently is relatively large.

A second disadvantage resides in the cost of drying the mixture of the precipitate and separated solids. Since the precipitate contains 90% or more of moisture which must be driven off in the dryer it follows that the dryer capacity must be quite large. A comparison between the dryer capacities in the Coffey process and the present process shows that the drying step of the present invention requires only one half the dryer capacity of the other process.

Another disadvantage is found in the fact that a relatively long period of time, from four to six hours, is required for the completion of the precipitation step.

The present invention is directed toward the elimination of these disadvantages of said improved process and has as a chief object the teaching of an inexpensive method for treating distillery slop whereby an increased yield of useful by-products may be obtained. A second object of the teaching is an improved method of treating distillery slop whereby the amount of apparatus used may be reduced to a minimum. Another object is the provision of means for treating distillery slop whereby the precipitation of solids in the same will be completed within a short period of time. Another object is the production of an improved distillery by-product.

Another object is an improved method of disposing of waste materials from a distillery, while a further object is the elimination of the nuisance heretofore present in the disposition of the waste matter from a distillery.

Other objects and advantages of the invention will be made apparent from the following disclosure of the same when considered in conjunction with the drawing, of which;

The accompanying drawing is a diagrammatic view of an installation which may be used in carrying out the invention. In said drawing an intake pipe 1 leading from the still is adapted to discharge into a vat 2 the hot thick slop remaining after the distillation process is completed. A storage tank 3 containing a solution of the precipitation agent is connected to vat 2 by a pipe 4 in which is located a suitable valve means 5. A mixer and agitating means 6 is provided for the purpose of thoroughly mixing and agitating the mixture of thick slop and the precipitation agent. A suitable pump means 7 withdraws the resulting mixture from vat 2 and delivers the same through a pipe 8 into a filtering means 10.

The mixing vat 2 is preferably located out of doors and is partially uncovered so that any gas, such as $CO_2$, which may form therein will be able to escape readily. It is contemplated that a plurality of such vats may be employed so that the discharge from the distillery can be uninterrupted and such discharge may be directed to any one of a number of vats. Similarly, the precipitation agent can be directed to any one of a plurality of vats and the pump means 7 may be connected to any one of such vats. It is desirable that a short time elapse from the time the precipitation agent is mixed with the thick slop until the mixture is placed on the filter 10. A period of 15 to 20 minutes is usually sufficient to insure a proper reaction. Meanwhile the agitating means 6 is in operation and prevents the settling of the precipitate and at the same time effects an intimate mixing of the slop and the precipitation agent.

It is found that the best operation is obtained when the precipitation agent in tank 3 is thoroughly mixed with cold water prior to mixing it with the thick slop. When the solution in tank 3 is thus kept cold a maximum of hypochlorous acid and a minimum of the chlorates will be retained therein.

When the cold solution of the precipitation agent is then mixed with the hot thick slop in vats 2, an accelerated reaction takes place.

The treated thick slop is then passed through filter 10. This filter is preferably of that type which permits a thorough refiltration of the filtrate such as is disclosed in the patent to J. Credo, 1,669,973. The thick mixture is carried by a moving conveyor 11 along a screen 12 through which the liquid filtrate may drain into an upper compartment 13. By means of a by-pass pipe 14 this liquid drains back over the moving precipitate and refilters through the same, draining into the lower compartment 15.

The precipitate through which the liquid has refiltered passes from filter 10 through a chute 16 into a press 20. Here said precipitate is moved by a moving screen 21 between rolls 22 which serve to express any liquid held by the precipitate, such liquid falling into a container 23 below the rolls. The moving screen 21 passes over pulleys 24 at the ends of the press and may be driven by any suitable means (not shown).

The liquid filtrate held in container 23 may be drained off through pipe 25 past valve 27 into waste pipe 28 and the liquid from filter 10 may be drained off through pipe 26 in similar fashion.

The precipitated solids coming from press 20 fall into hopper 30 leading into the inlet end 31 of a rotary dryer 32. Adjacent the hopper 30 is located the exhaust 33 of the dryer. While any suitable type of dryer may be employed it has been found desirable to use a dryer of the so-called counter current type wherein the drying medium and the material to be dried move in opposite directions. In the dryer as diagrammatically shown the precipitate entering inlet 31 will be moved to an outlet header 34. Here as a dried, granular material it will be picked up by the suction of a suitable fan means 35 and moved through pipe 36 into a separator 37. Here the dry feed substance will fall through pipe 38 into a storage bin 39 while the air will escape through the vent of the separator.

This feed substance has many desirable characteristics. It has a high protein percentage which may run as much as 31 to 32%. It has substantially no lactic acid content since the lactic acid found in the distillery slop is either changed by a chemical reaction with the precipitation agent or else is wholly drained off as waste. The gums and resins of the soluble solids also drain off as waste and do not enter into the by-product. A further desirable feature of the feed produced by this process resides in the fact that it has been purified or disinfected by its contact with the chlorine liberated by the precipitation agent. Should any chlorine pass into the dryer along with the precipitate, such chlorine will be driven off by the heat of the dryer and will pass out through the dryer exhaust.

While the invention has been disclosed as being particularly well adapted to the treatment of distillery slop it will be apparent that the same could be used in the treatment of other waste liquids such as brewery refuse and the like.

Having thus disclosed the invention, it is obvious that variations of the same may be employed without departing from the teaching thereof and it is our intention to cover by the appended claims such changes as may reasonably be included within the scope thereof.

We claim:

1. The method of treating thick distillery slop to produce an unadulterated feed substance therefrom containing the valuable small grain elements normally held in colloidal suspension in the slop comprising, adding chlorine to the thick slop as a coagulating agent, agitating the chlorinated slop to effect a thorough mixing and to coagulate the soluble proteids therein in order to break up the colloidal suspensions, filtering from the slop the small grain particles released from the broken colloidal suspensions together with the heavy precipitate of the thick slop, drying the filtered solids in the presence of air and removing therefrom by means of the air all traces of the coagulating agent.

2. The method of treating thick distillery slop to produce a feed substance therefrom containing the valuable small grain elements normally held in colloidal suspension in the slop comprising, adding a hypochlorite to the thick slop as a coagulating agent, agitating the chlorinated slop to effect a thorough mixing and to coagulate the soluble proteids therein in order to break up the colloidal suspensions, filtering from the slop the small grain particles released from the broken colloidal suspensions together with the heavy precipitate of the thick slop, drying the filtered solids in the presence of air and removing therefrom by means of the air all traces of the chlorine.

3. The method of treating thick distillery slop to produce a feed substance therefrom containing the valuable small grain elements normally held in colloidal suspension in the slop comprising, adding a hypochlorous agent to the thick slop as a coagulating agent, agitating the chlorinated slop to effect a thorough mixing and to coagulate the soluble proteids therein in order to break up the colloidal suspensions, filtering from the slop the small grain particles released from the broken colloidal suspensions together with the heavy precipitate of the thick slop, drying the filtered solids in the presence of air and removing therefrom by means of the air all traces of the chlorine.

ADOLPH W. LISSAUER.
JAMES R. COFFEY.